(12) United States Patent
Stoppe et al.

(10) Patent No.: US 11,506,485 B2
(45) Date of Patent: Nov. 22, 2022

(54) MATERIAL TESTING BY ANGLE-VARIABLE ILLUMINATION

(71) Applicants: Carl Zeiss Industrielle Messtechnik GmbH, Oberkochen (DE); Carl Zeiss Microscopy GmbH, Jena (DE)

(72) Inventors: Lars Stoppe, Jena (DE); Thomas Milde, Nausnitz (DE); Michael Totzeck, Schwaebisch Gmuend (DE)

(73) Assignees: Carl Zeiss Industrielle Messtechnik GmbH, Oberkochen (DE); Carl Zeiss Microscopy GmbH, Oberkochen (DE)

( * ) Notice: Subject to any disclaimer, the term of this patent is extended or adjusted under 35 U.S.C. 154(b) by 0 days.

(21) Appl. No.: 16/664,734

(22) Filed: Oct. 25, 2019

(65) Prior Publication Data

US 2020/0158499 A1 May 21, 2020

Related U.S. Application Data

(63) Continuation of application No. PCT/EP2018/060294, filed on Apr. 23, 2018.

(30) Foreign Application Priority Data

Apr. 26, 2017 (DE) .................. 102017108874.1

(51) Int. Cl.
*H04N 5/225* (2006.01)
*G01B 11/25* (2006.01)
*G06T 7/00* (2017.01)

(52) U.S. Cl.
CPC .......... *G01B 11/2513* (2013.01); *G06T 7/001* (2013.01); *H04N 5/2256* (2013.01); *G06T 2207/10056* (2013.01)

(58) Field of Classification Search
CPC combination set(s) only.
See application file for complete search history.

(56) References Cited

U.S. PATENT DOCUMENTS 5,142,648 A  8/1992  Fitts et al.
5,442,189 A  8/1995  Hagiwara
(Continued)

FOREIGN PATENT DOCUMENTS

DE  102005052061 A1  5/2007
DE  102012106584    *  1/2014
(Continued)

OTHER PUBLICATIONS

Boracchi et al.; Uniform Motion Blur in Poissonian Noise: Blur/Noise Tradeoff; Feb. 2011; 7 pages.
(Continued)

*Primary Examiner* — Md N Haque
(74) *Attorney, Agent, or Firm* — Miller Johnson

(57) ABSTRACT

An optical system includes an illumination module configured to illuminate a sample object with at least one angle-variable illumination geometry. The optical system includes an imaging optical unit configured to produce an imaged representation of the sample object that is illuminated with the at least one angle-variable illumination geometry on a detector. The optical system includes the detector, which is configured to capture at least one image of the sample object based on the imaged representation. The optical system includes a controller configured to determine a result image based on a transfer function and the at least one image. A method includes illuminating a sample object with at least one angle-variable illumination geometry, imaging the sample object on a detector, based on the imaged represen- (Continued)

tation, capturing at least one image of the sample object, and, based on a transfer function and the at least one image, determining a result image.

21 Claims, 12 Drawing Sheets

(56) References Cited

U.S. PATENT DOCUMENTS

| | | | |
|---|---|---|---|
| 6,891,671 B1 | 5/2005 | Greenberg | |
| 2004/0105093 A1 | 6/2004 | Hamamatsu et al. | |
| 2006/0116764 A1* | 6/2006 | Simpson | A61F 2/164 351/159.11 |
| 2008/0068593 A1 | 3/2008 | Nakano et al. | |
| 2015/0181131 A1* | 6/2015 | Kerwien | H04N 5/262 348/239 |
| 2016/0080726 A1 | 3/2016 | Rangarajan et al. | |
| 2016/0309068 A1 | 10/2016 | Nadeau et al. | |
| 2017/0262968 A1* | 9/2017 | Stoppe | G06T 5/003 |
| 2017/0276923 A1* | 9/2017 | Stoppe | A61B 6/5235 |
| 2017/0371141 A1* | 12/2017 | Besley | G06T 5/50 |

FOREIGN PATENT DOCUMENTS

| | | |
|---|---|---|
| DE | 102012106584 A1 | 1/2014 |
| DE | 102014112242 A1 | 3/2016 |
| DE | 102014113258 A1 | 3/2016 |
| DE | 102015110339 A1 | 7/2016 |
| EP | 0689046 A1 | 12/1995 |
| JP | 2008096430 A | 4/2008 |
| KR | 1020070108957 A | 11/2007 |
| WO | WO-2015179452 A1 | 11/2015 |
| WO | WO-2016030390 A2 | 3/2016 |
| WO | WO-2016041944 A1 | 3/2016 |

OTHER PUBLICATIONS

Klette et al.; Shape from Shading and Photometric Stereo Methods; May 1998; 57 pages.
Prados et al.; Shape from Shading; 2006; 17 pages.
Chen et al.; 3D Differential Phase Contrast Microscopy; Oct. 2016; 11 pages.
Search Report for DE Application No. DE 102017 108 874.1; dated Apr. 26, 2017; 7 pages.
International Search Report and Written Opinion for PCT Application No. PCT/EP2018/060294; dated Jul. 30, 2018; 14 pages.
Lei Tran et al.; Quantitative differential phase contrast imaging in an LED array microscope; Optical Society of America; 2015; 10 pages.
Office Action for KR Application No. 1020197034496 ; dated Mar. 25, 2021; 3 pages.
Office Action for KR Application No. 1020197034496 ; dated Aug. 31, 2021; 6 pages.
European Patent Office, Communication pursuant to Article 94(3) EPC for EP Application No. 18722421.7, dated Oct. 27, 2021.
China National Intellectual Property Administration, CN Office Action for App. No. 201880027283.5, dated Sep. 9, 2021.
Japan Patent Office, Notification of Reasons for Refusal for App.. No. 2019-558395, dated Oct. 5, 2021.

* cited by examiner

FIG. 16

Detecting anomalies in the result image 1011

MATERIAL TESTING BY ANGLE-VARIABLE ILLUMINATION

CROSS-REFERENCE TO RELATED APPLICATIONS

This application is a continuation of International Application No. PCT/EP2018/060294 filed Apr. 23, 2018, which claims the benefit of DE 10 2017 108 874.1 filed Apr. 26, 2017. The entire disclosures of the applications referenced above are incorporated by reference.

FIELD

The present disclosure generally relates to optical metrology and more particularly to an optical system illuminating a sample object with an angle-variable illumination geometry.

BACKGROUND

It may frequently be desirable in material testing to produce a height profile of a sample object. It is then possible to detect, for example, anomalies based on the height profile.

One technique for determining a height profile is what is known as "shape from shading" (SFS). See for example Prados, Emmanuel, and Olivier Faugeras. "Shape from shading." Handbook of mathematical models in computer vision (2006): 375-388. SFS has specific disadvantages and limitations. For example, it may frequently be complicated and complex to obtain a sufficiently large number of images for performing a reconstruction of the height profile. In addition, corresponding techniques can be time-intensive and susceptible to errors.

SUMMARY

Therefore, there is a need for improved techniques for material testing. In particular, there is a need for such techniques that eliminate or alleviate at least some of the limitations and disadvantages mentioned above.

This object is achieved by the features of the independent patent claims. The features of the dependent patent claims define embodiments.

In one example, an optical system comprises an illumination module. The illumination module is set up for illuminating a sample object with at least one angle-variable illumination geometry. The optical system also comprises an imaging optical unit. The imaging optical unit is set up for producing an imaged representation of the sample object that is illuminated with the at least one angle-variable illumination geometry on a detector. The optical system also comprises the detector. The detector is set up for capturing at least one image of the sample object based on the imaged representation. The optical system also comprises a controller. The controller is set up for determining a result image based on a transfer function and the at least one image.

Based on the result image, anomalies in the result image, for example, can be made visible particularly well. It would also be possible for the controller to furthermore be set up for detecting anomalies in the result image. Generally, it can be possible using the result image to perform accurate material testing on the sample object. For example, a height profile of the sample object could be made visible.

In one example, a method comprises illuminating a sample object with at least one angle-variable illumination geometry. The method furthermore comprises imaging the sample object that is illuminated with the at least one angle-variable illumination geometry on a detector. The method furthermore comprises capturing at least one image of the sample object based on the imaged representation. The method furthermore comprises determining a result image based on a transfer function and the at least one image.

A computer program product comprises program code that can be executed by at least one processor. Executing the program code causes the at least one processor to carry out a method. The method comprises illuminating a sample object with at least one angle-variable illumination geometry. The method furthermore comprises imaging the sample object that is illuminated with the at least one angle-variable illumination geometry on a detector. The method furthermore comprises capturing at least one image of the sample object based on the imaged representation. The method furthermore comprises determining a result image based on a transfer function and the at least one image.

A computer program comprises program code that can be executed by at least one processor. Executing the program code causes the at least one processor to carry out a method. The method comprises illuminating a sample object with at least one angle-variable illumination geometry. The method furthermore comprises imaging the sample object that is illuminated with the at least one angle-variable illumination geometry on a detector. The method furthermore comprises capturing at least one image of the sample object based on the imaged representation. The method furthermore comprises determining a result image based on a transfer function and the at least one image.

Such techniques can make reliable detection of unevennesses or soiling of the sample object based on the result image possible, for example by analyzing the height profile or by identifying anomalies. This is based on the fact that the result image can image a height profile of the sample object.

The features set out above and features that are described below may be used not only in the corresponding combinations explicitly set out, but also in further combinations or in isolation, without departing from the scope of protection of the present invention.

BRIEF DESCRIPTION OF THE FIGURES

FIG. 16 is a flowchart of an example method.

DETAILED DESCRIPTION

Figure 1:
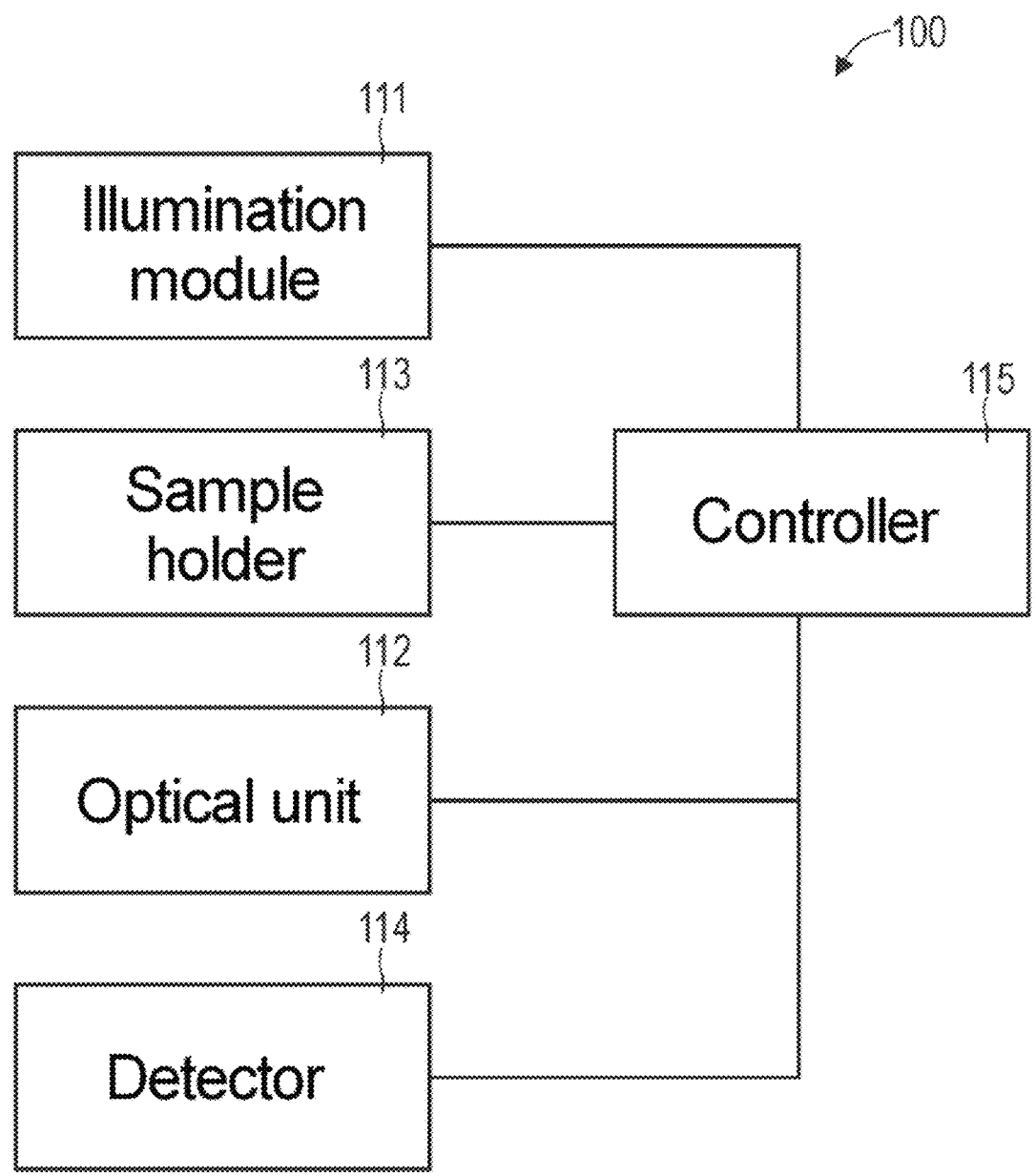
FIG. 1 schematically illustrates an optical system according to various examples, wherein the optical system has an illumination module that is set up to illuminate a sample object with an angle-variable illumination geometry.

The properties, features and advantages of this invention described above and the way in which they are achieved will become clearer and more clearly comprehensible in association with the following description of the example embodiments which are explained in greater detail in association with the drawings.

In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art. Connections and couplings between functional units and elements as illustrated in the figures may also be implemented as an indirect connection or coupling. A connection or coupling may be implemented in a wired or wireless manner. Functional units may be implemented as hardware, software or a combination of hardware and software.

As used herein, the phrase at least one of A, B, and C should be construed to mean a logical (A OR B OR C), using a non-exclusive logical OR, and should not be construed to mean "at least one of A, at least one of B, and at least one of C."

Techniques will be described below for determining a result image with tailored contrast. The result image can generally provide a height profile of the sample object. The result image can therefore be used for material testing of a sample object. As an example, the result image can be processed to determine contrast values across the result image. The contrast values may be calculated according to formulas based on one or more of Weber contrast, simple contrast, Michelson contrast, peak-to-peak contrast, and root mean square (RMS) contrast. The contrast values of the result image may be indicative of the height of the sample object. For example, the contrast value at a location of the result image may be proportional to the height of the sample object at the corresponding location.

As a result, the contrast values may directly serve as a height profile of the sample object. In various implementations, the contrast values may be transformed in some way, such as by linear scaling, to generate the height profile. Anomalies in the height profile may indicate imperfections or contaminants of the sample object. In some examples, the contaminants may be dust particles on a silicon wafer or clumped powder in an additive manufacturing powder bed. Detection of the imperfections or contaminants may allow (i) performance of a process to remove the imperfections or contaminants; (ii) adjustment of a process to mitigate their presence, such as by dynamically adjusting a subsequent manufacturing step; or (iii) adjustment of future process iterations to reduce the risk of reappearance of such imperfections or contaminants.

The techniques described herein make it possible to determine the result image by digitally post-processing one or more images of a sample object. For example, it would be possible for the one image or the plurality of images of the sample object to be intensity images that do not present a height profile themselves.

The one image or the plurality of images of the sample object can be associated with different illumination geometries. That means that the one image or the plurality of images can be captured in each case by a detector with simultaneous illumination of the sample object by way of a corresponding illumination geometry.

The different illumination geometries can be associated for example with different illumination directions. The different illumination geometries or the associated different images can be separated from one another by way of time division multiplexing or frequency division multiplexing. Separation by way of different polarizations would also be possible. The illumination geometries can have a directional dependence. For example, the illumination geometries can have a gradient of the illuminance along one or more spatial directions. For example, the illuminance could vary incrementally along a spatial direction, for example between zero and a finite value or between two different finite values.

The sample object could be opaque for the light used. For example, the sample object could comprise a bulk solid body element, for example a textile or fabric, a metallic component, etc. Depending on the type of the sample object, it may be desirable to operate the illumination module and the detector in reflected light geometry or transmitted light geometry.

In different examples, at least one transfer function is used for digitally post-processing one or more images to obtain the result image. For example, the transfer function can designate an object transfer function and/or an optics transfer function of the optical system. The transfer function can be suitable for predicting the at least one image at a specific illumination and for a specific sample object. For example, the transfer function can have a real-value part and/or an imaginary part. Techniques will be described below, among other things, for determining the imaginary part of the transfer function. For the sake of simplicity, reference will not always be made below to the fact that the techniques relate to the imaginary part of the transfer function. In some examples, a purely imaginary transfer function without a real-value part can be used.

In this case, various techniques can be used for determining the transfer function. Depending on the transfer function used, different techniques can be used to determine the result image. One example technique is based on a Tikhonov regularization, that is to say a result image is determined there by way of an inverse Fourier transform and based on the transfer function H* and furthermore based on the spatial frequency space representation of a combination $\tilde{I}_{DPC}$ of two images of the sample object with different illumination geometries:

$$\mathcal{F}^{-1}\left\{\frac{\sum_j H_j^*(u)\cdot \tilde{I}_{DPC,j}(u)}{\sum_j |H_j(u)|^2 + \alpha}\right\} \quad (1)$$

α is a regularization parameter. In this case, $\tilde{I}_{DPC}$ describes the spectral decomposition of a combination of two images $I_T$ and $I_B$, which were captured at different illumination geometries that illuminate semicircles that are complementary with respect to one another:

$$I_{DPC} = \frac{I_T - I_B}{I_T + I_B} \quad (2)$$

These are examples. Generally, the illumination geometry does not, for example, strictly have to be of semicircular shape. For example, four light-emitting diodes that are arranged on a semicircle could be used. For example, defined or discrete illumination directions could thus be used, that is to say individual light-emitting diodes. It is furthermore possible in equation 2 for the normalization to one to also be effected, instead of to $I_T+I_B$, or to another value. Instead of performing a calculation with $I_T$ and $I_B$, in other examples, the raw data themselves could also be used, that is to say for example $I_{DPC}=I_T$ or $I_{DPC}=I_B$. By forming a corresponding quotient in equation 2, it is possible to reduce influences that are otherwise a disturbance, such as other fabric properties, color, etc. By forming the difference, it is in particular possible to reduce an absorption part based on a real-value part of the transfer function. $I_{DPC}$ is proportional to the local increase of the phase shift based on the sample object. The phase shift can be caused by a change in the thickness of the sample object or of the topography of the sample object and/or by a change in the optical properties.

For example, two images $I_{DPC,1}$ and $I_{DPC,2}$ can be determined, once with a pair of semicircular illumination geometries arranged top-bottom in a lateral plane perpendicular to the beam path ($I_{DPC,1}$), and once with a pair of semicircular illumination geometries arranged left-right in the lateral plane ($I_{DPC,2}$). It is then also possible to take into account a combination of $I_{DPC,1}$ with $I_{DPC,2}$ when determining the result image, that is to say by adding up by way of the summation index j in equation 1.

The spatial frequency space can designate the space that is conjugate to real space. It is possible to transform using Fourier analysis and inverse Fourier analysis between the real space and the spatial frequency space. Spatial frequencies here designate the reciprocal value of a spatial period length.

Such techniques are based on specific assumptions and simplifications, for example in the case of the aforementioned formulation of a weak object approximation. However, in other examples, other approximations and formalisms can be used. For example, an inversion other than the Tikhonov regularization could be used, for example direct integration or Fourier filtering of a different configuration. Even in such variations it is possible for the underlying properties of the transfer function, as described in various examples herein, to be maintained.

FIG. 1 illustrates an example optical system 100. By way of example, the optical system 100 in accordance with the example in FIG. 1 could implement a light microscope with reflected light geometry. For example, a corresponding light microscope with reflected light geometry could be used for material testing. A height profile of the sample object can be created for this purpose.

The optical system 100 may allow the magnified representation of small structures of a sample object fixated to a sample holder 113. By way of example, the optical system 100 could implement a wide-field microscope, in which a sample is illuminated over its entire area. In some examples, the imaging optical unit 112 can create an imaged representation of the sample object on a detector 114. Then, the detector 114 can be set up to detect one or more images of the sample object. Observation through an eyepiece is likewise conceivable.

In some examples, imaging optical units 112 with a large aperture can be used. For example, the imaging optical unit 112 could have a numerical aperture of no less than 0.2, optionally of no less than 0.3, further optionally of no less than 0.5. By way of example, the imaging optical unit 112 could have an immersion objective.

The optical system 100 also comprises an illumination module 111. The illumination module 111 is set up to illuminate the sample object fixated on the sample holder 113. By way of example, this illumination could be implemented by Köhler illumination. Here, use is made of a condenser lens and a condenser aperture stop. This leads to a particularly homogeneous intensity distribution of the light used for illumination purposes in the plane of the sample object. For example, partially incoherent illumination can be implemented. The illumination module 111 could also be set up to illuminate the sample object in dark field geometry.

In the example of FIG. 1, the illumination module 111 is set up to make angle-variable illumination possible. This means that different illumination geometries of the light employed to illuminate the sample object can be implemented by the illumination module 111. The different illumination geometries can correspond to an illumination of the sample object from different illumination directions. This is why angle-variable illumination is sometimes referred to as illumination structured in angle space.

Here, different hardware implementations are possible for providing the different illumination geometries in the various examples described herein. By way of example, the illumination module 111 could comprise a plurality of adjustable illumination elements that are set up to locally modify or emit light. A controller 115 can actuate the illumination module 111 or the illumination elements for the purposes of implementing a certain illumination geometry.

By way of example, the controller 115 could be implemented as a microprocessor or microcontroller. As an alternative or in addition thereto, the controller 115 could comprise an FPGA or ASIC, for example. As an alternative or in addition thereto, the controller 115 can also actuate the sample holder 113, the imaging optical unit 112 and/or the detector 114.

Figure 2:
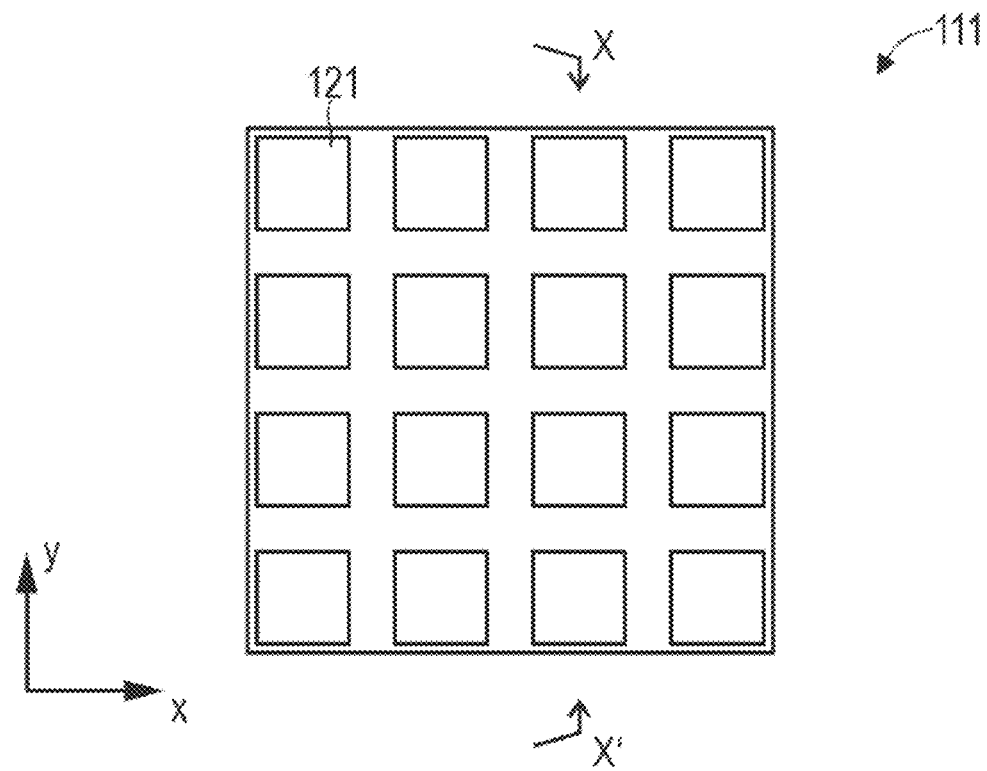
FIG. 2 schematically illustrates the illumination module having a multiplicity of illumination elements in greater detail.

FIG. 2 illustrates aspects in relation to the illumination module 111. FIG. 2 illustrates that the illumination module 111 comprises a multiplicity of adjustable illumination elements 121 in a matrix structure. Here, the matrix structure is oriented in a plane perpendicular to the beam path of the light (lateral plane; real space coordinates x, y).

Instead of a matrix structure it would also be possible, in other examples, to use different geometric arrangements of the adjustable elements, for example a ring-shaped arrangement, a semicircular arrangement, etc.

In one example, the adjustable illumination elements 121 could be implemented as light sources, for example as light-emitting diodes. Then, it would be possible, for example, for different light-emitting diodes with different luminous intensities to emit light for illuminating the sample object. An illumination geometry can be implemented in this way. In a further implementation, the illumination module 111 could be implemented as a spatial light modulator (SLM). The SLM can undertake an intervention in a condenser pupil in a spatially resolved manner, which may have a direct effect on the imaging.

Figure 3:
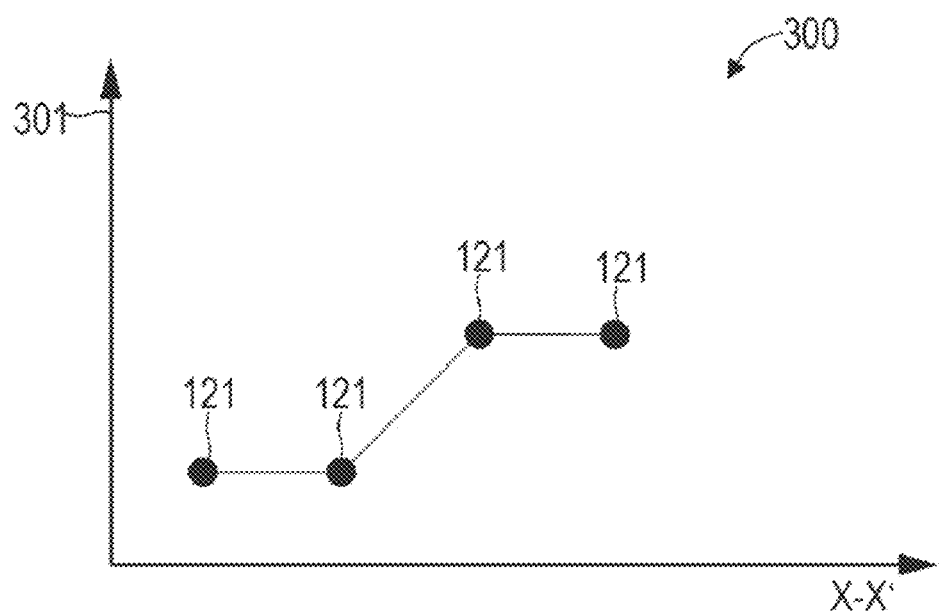
FIG. 3 schematically illustrates an example illumination geometry that can be used by way of the illumination module for illuminating the sample object.

FIG. 3 illustrates aspects in relation to an example illumination geometry 300. FIG. 3 illustrates the provided luminous intensity 301 for the adjustable illumination elements 121 of the illumination module 111 along the axis X-X' of FIG. 2. The illumination geometry 300 exhibits a dependence on the position along the axis X-X' and is therefore structured.

Figure 4:
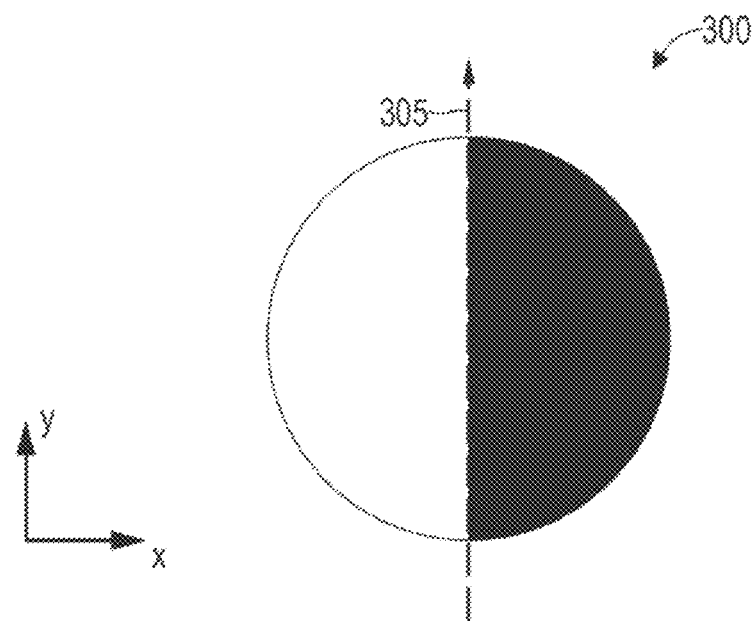
FIG. 4 schematically illustrates an example illumination geometry that can be used by way of the illumination module for illuminating the sample object.
Figure 5:
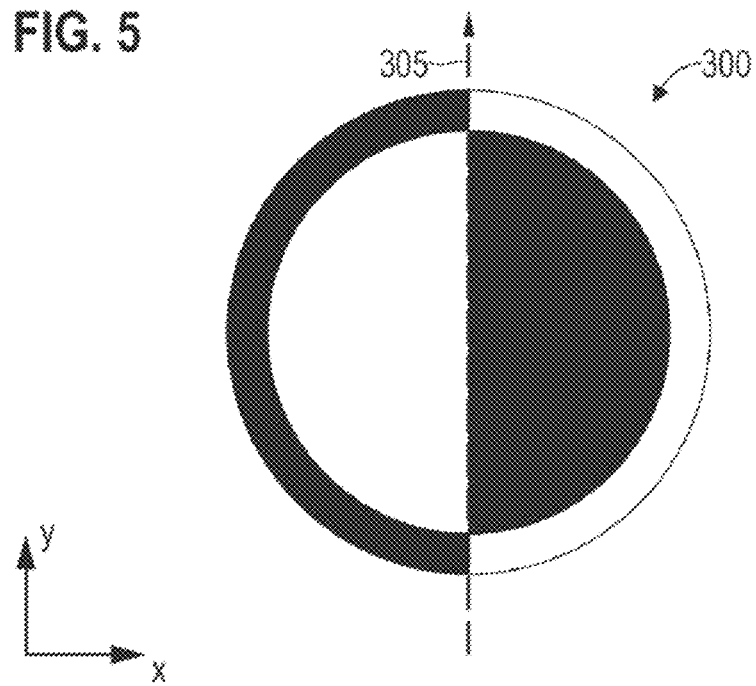
FIG. 5 schematically illustrates an example illumination geometry that can be used by way of the illumination module for illuminating the sample object.

FIG. 4 illustrates aspects in relation to an example illumination geometry 300. FIG. 4 illustrates the illumination geometry 300 abstractly of the illumination module 111 used. In the example in FIG. 4, an illumination geometry 300 in which one side is illuminated (black color in FIG. 4) and the other side is not illuminated (white color in FIG. 4) is used. FIG. 5 illustrates a further example illumination geometry (with corresponding color coding, as already described with reference to FIG. 4).

Figure 6:
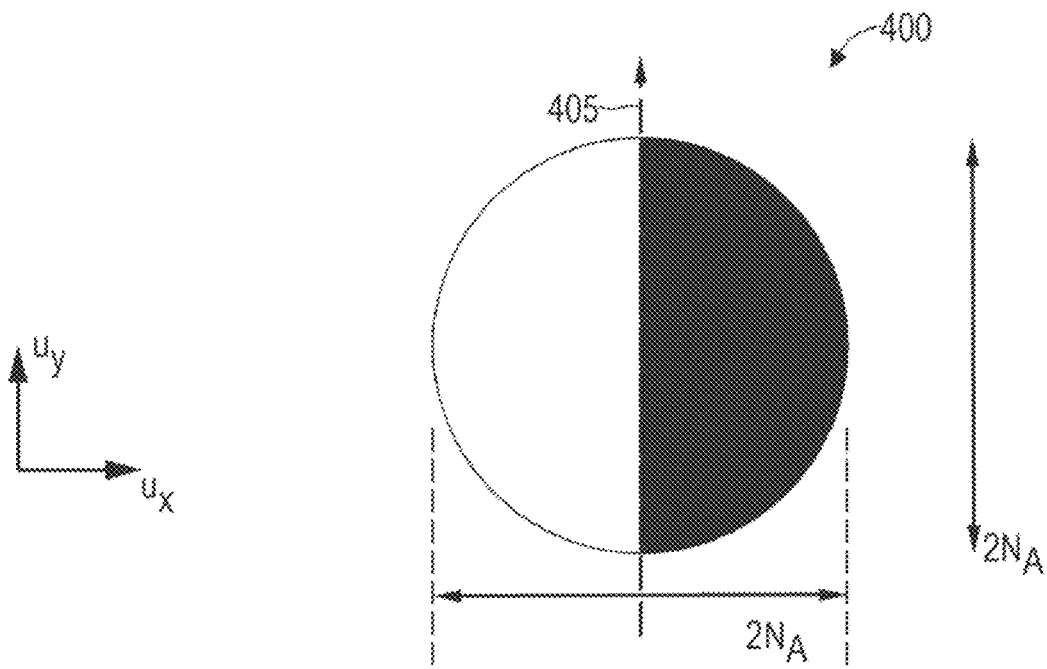
FIG. 6 schematically illustrates a transfer function that can be used in accordance with various examples when determining a result image.

FIG. 6 illustrates aspects in relation to an example transfer function 400 (wherein in FIG. 6, black codes an absolute value of +1 and white codes an absolute value of −1; the coordinates $u_x$ and $u_y$ are defined in the spatial frequency space and correspond there to the real space coordinates x and y). The transfer function 400 can be used to determine a result image based on an image that was captured for example with the illumination geometry 300 in accordance with the example of FIG. 4. The result image can contain a height profile of the sample object.

In the example in FIG. 6, the transfer function 400 has an axis of symmetry 405 which corresponds to an axis of symmetry 305 of the illumination geometry 300. It is hereby possible that the transfer function 400 is selected appropriately with respect to the illumination geometry 300. In this way, the result image can exhibit a particularly strong contrast.

FIG. 6 also illustrates the diameter of the detector aperture of the imaging optical unit 112. Since partially incoherent illumination is used, the transfer function up to twice the size of the detector aperture of the imaging optical unit 112 is non-zero.

Figure 7:
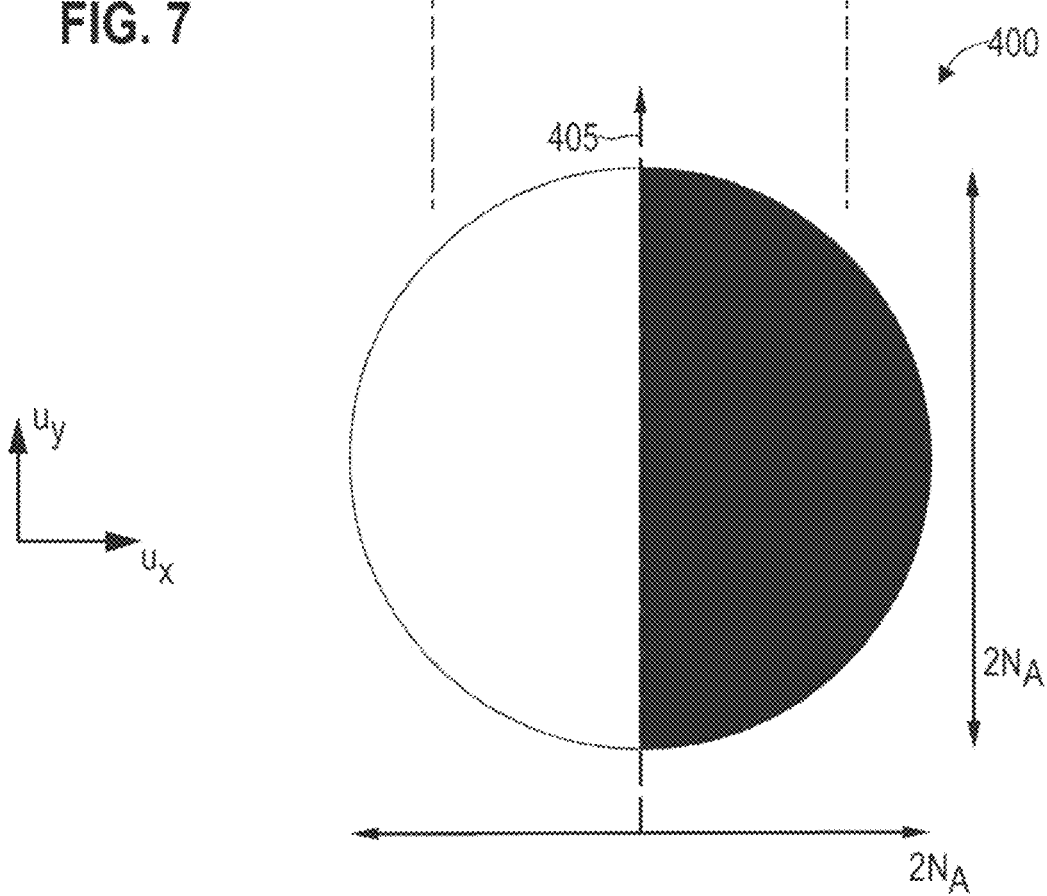
FIG. 7 schematically illustrates a transfer function that can be used according to various examples when determining a result image, wherein the transfer function in accordance with FIG. 7 is scaled with respect to the transfer function in accordance with FIG. 8.

FIG. 7 also illustrates aspects in relation to a transfer function 400. The example in FIG. 7 corresponds here, in principle, to the example in FIG. 6. However, in the example in FIG. 6, the size of the detector aperture is greater than in the example in FIG. 6 (cf. horizontal dashed lines; $N_A$ designates the size of the detector aperture).

However, the transfer function 400 is thereby correspondingly scaled to the detector aperture that is enlarged in FIG. 7 as compared to FIG. 6. By way of example, the transfer function 400 in accordance with the example in FIG. 6 could serve as a reference transfer function. In that case, for example the controller 115 could be set up to determine the transfer function 400 in accordance with the example in FIG. 7 based on scaling of said reference transfer function to the enlarged aperture of the imaging optical unit 112.

Based on such techniques, it is possible for a particularly large aperture for the imaging optical unit 112 to be used, which may be desirable in specific cases of application for imaging by way of the optical system 100.

In the examples in FIGS. 6 and 7, it is apparent that the region within which the transfer function 400 assumes non-zero values can be determined by the size of the aperture of the imaging optical unit 112.

Such techniques are based on the finding that it can also be possible for transfer functions 400 that are scaled in dependence on the size of the aperture of the imaging optical unit to determine the result image with a meaningful contrast—for example, a height profile of the sample object. Here, the contrast in the result image may in some examples contain no quantitative description of the topography of the sample object, but a qualitative description of the topography of the sample object. In particular, the qualitative description of the topography of the sample object can be provided consistently in the region of the entire image. This can have an advantage in particular as compared to reference techniques in which different real-space gradients of the topography of the sample object—for example at opposite edges of the sample object—with different sign of the contrast are imaged in the result image.

Figure 8:
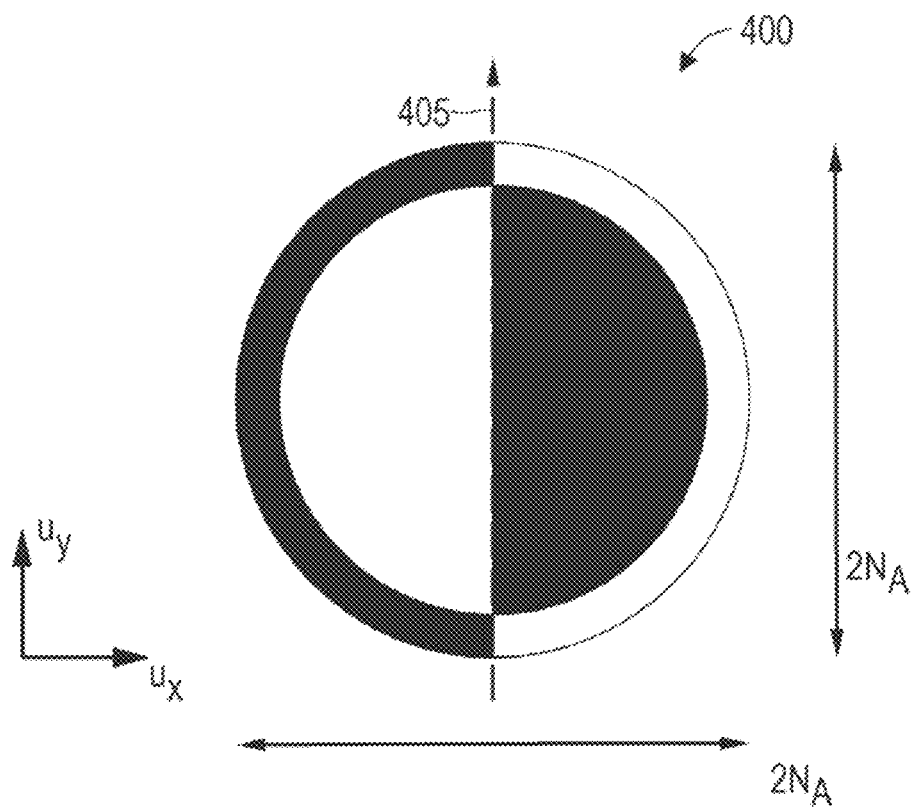
FIG. 8 schematically illustrates a transfer function that can be used in accordance with various examples when determining a result image.

FIG. 8 illustrates aspects relating to a transfer function 400 (wherein in FIG. 8, black codes an absolute value of +1 and white codes an absolute value of −1; the coordinates $u_x$ and $u_y$ are defined in the spatial frequency space and correspond there to the real space coordinates x and y). The transfer function 400 can be used to determine a result image based on an image that was captured for example with the illumination geometry 300 in accordance with the example of FIG. 5. FIG. 8 also illustrates the diameter of the detector aperture of the imaging optical unit 112.

It is apparent from FIGS. 6-8 that the transfer function 400 can be determined in dependence on the angle-variable illumination geometry 300. It is in particular possible that the geometry of the transfer function 400 in the spatial frequency space replicates the illumination geometry 300 in real space. Using such techniques, it is possible to achieve a particularly strong contrast in the result image, that is to say a high signal-to-noise ratio for example for the height profile.

Figure 9:
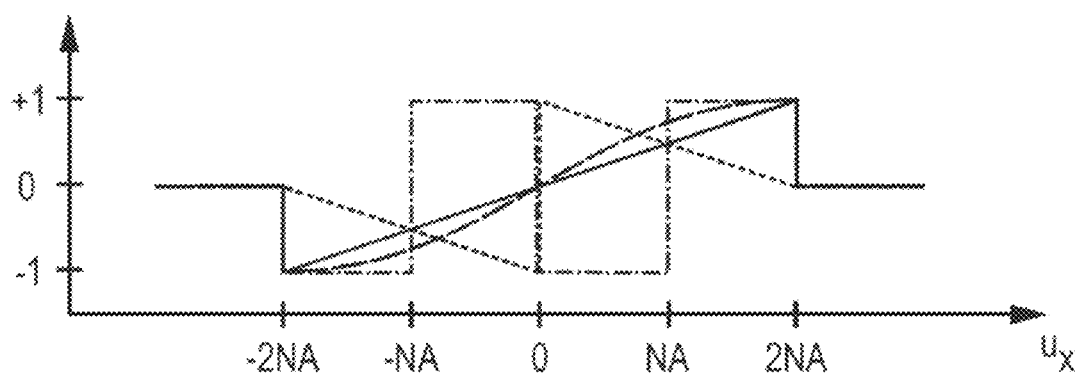
FIG. 9 schematically illustrates transfer functions that can be used in accordance with various examples for determining a result image.

FIG. 9 illustrates aspects in relation to different transfer functions 400 (different transfer functions are illustrated in FIG. 9 with the solid line, the dashed line, the dotted line, and the dashed-dotted line).

The transfer functions 400 illustrated in FIG. 9 can be used for example for different illumination geometries (the illumination geometries are not illustrated in FIG. 9).

FIG. 9 illustrates the transfer function 400 along an axis $u_x$ of the spatial frequency space. In some examples, the transfer function could have a variation merely along one coordinate of the spatial frequency space; in other examples, there could however be a variation along two orthogonal axes $u_x$ and $u_y$.

In the example in FIG. 9, for example a transfer function 400 is in the form of a monotonously increasing linear function (solid line). In addition, in the example of FIG. 9, a further transfer function 400 is in the form of a monotonously increasing sigmoid function (dashed line). In the example of FIG. 9, a further transfer function 400 is in the form of a convolved, monotonously decreasing, linear function (dotted line). In the example of FIG. 9, a further transfer function 400 is in the form of a step function (dotted line).

Such forms of transfer functions 400 are simply for example, and in other examples transfer functions of different forms can be used or superpositions of the transfer functions 400 illustrated in the example of FIG. 9. However, the transfer functions used in the various examples described herein can have specific features or characteristics that make particularly good determination of the result image possible. Such features of transfer functions used will be described below.

It is apparent from the examples of the transfer functions 400 in FIG. 9 that it is possible to embody the transfer functions 400 for spatial frequencies within the aperture of the imaging optical unit 112 without local extreme values, that is to say without local maxima or minima that would be smaller than the absolute extreme values (that is to say the amplitudes of +1 and −1 in the example of FIG. 9). This can be attained by way of a monotonously increasing or decreasing transfer function or by way of a step function.

Such avoidance of local extreme values can have in particular advantageous effects in relation to the reduction of signal noise or artifacts in the result image. Sometimes it may occur that—for example due to the construction—a deviation between the actual aperture and the nominal aperture of the imaging optical unit is present. In that case, the position of the local extreme values of the transfer function in relation to the actual aperture can be positioned incorrectly in the spatial frequency space; this has the effect that frequencies contained in the images erroneously experience strong amplification on the basis of the local extreme values that are positioned incorrectly in the spatial frequency space with respect to the actual aperture, which can result in artifacts in the result image. Since according to the different examples described herein a transfer function without local extreme values is used within the detector aperture or twice the detector aperture, such erroneous amplification of frequencies contained in the images on account of a local extreme value of the transfer function that is positioned in a displaced manner can be avoided. The result is uniform propagation of the frequencies contained in the captured images.

It is furthermore apparent from the examples of the transfer functions 400 illustrated in FIG. 9 that implementations are possible in which the transfer function for spatial frequencies within the aperture of the imaging optical unit 112 or within twice the aperture of the imaging optical unit 112 does not assume values or substantially no values equal to 0, that is to say assumes only finite non-zero values. Generally, it may sometimes be desirable to avoid that the transfer function for spatial frequencies within the aperture of the imaging optical unit 112 or within twice the aperture of the imaging optical unit 112 assumes comparatively small values—for example with reference to a maximum of all absolute values of the transfer function for spatial frequencies within the corresponding region. For example, it would be possible that the transfer function for spatial frequencies within the aperture or twice the aperture of the imaging optical unit 112 has no absolute values<5% of a maximum of all absolute values of the transfer function 400 for spatial frequencies within the aperture of the imaging optical unit 112, optionally no values<2%, further optionally no values<0.5%. Such behavior can be provided for example by a step function.

Such techniques are based on the finding that values equal to zero for the transfer function 400 can correspond to a suppression of the corresponding frequencies contained in the images. However, frequently it may be desirable that no suppression of corresponding frequencies contained in the images is effected within the aperture of the imaging optical unit 112 or within twice the aperture of the imaging optical unit 112.

It is furthermore apparent from the example in FIG. 9 that the transfer functions illustrated there for spatial frequencies outside twice the aperture of the imaging optical unit 112 assume values equal to zero. It may generally be possible that transfer functions are used outside of which spatial frequencies transferred by the imaging optical unit 112 assume values of substantially equal to zero, that is to say typically outside the single aperture or twice the aperture with partially phase-incoherent illumination. For example, it would be possible that the transfer functions used for spatial frequencies outside the single aperture or twice the aperture of the imaging optical unit have no absolute values>5% of a maximum of all absolute values of the transfer functions for spatial frequencies within the single aperture or twice the aperture of the imaging optical unit, optionally no values greater than 2%, further optionally no values greater than 0.5%. In this way it is possible to avoid that artifacts or noise is/are amplified in the result image.

Figure 10:
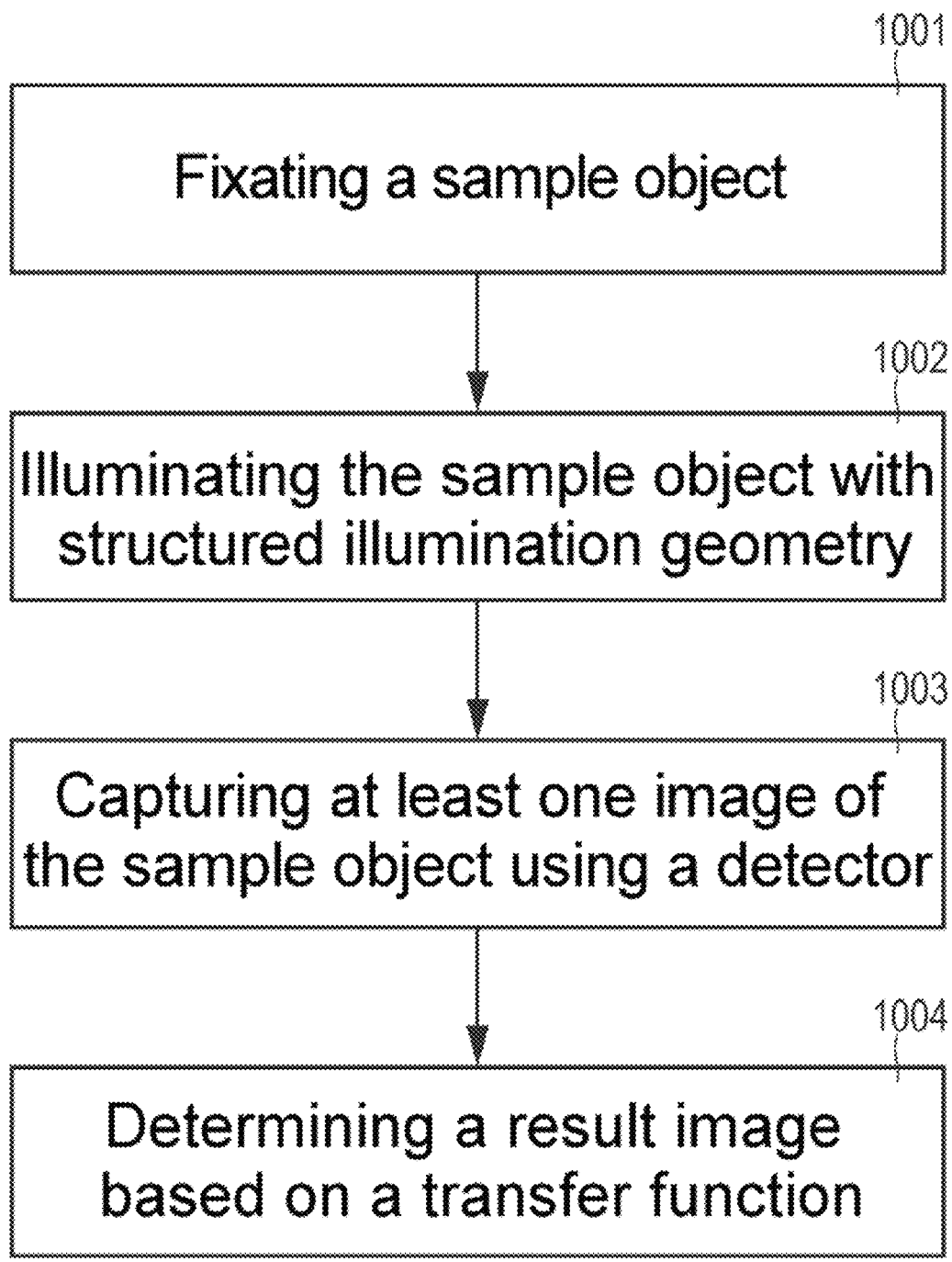
FIG. 10 is a flowchart of an example method.

FIG. 10 is a flowchart of an example method. First, in 1001, a sample object is fixated, for example using a sample holder. The sample object could be for example a material sample of a bulk material. 1001 is optional.

Next, in 1002, the sample object is illuminated with one or more angle-variable illumination geometries. To this end, a corresponding illumination module can be actuated accordingly. For example, it would be possible for the sample object to be illuminated with two complementary illumination geometries that are for example of semicircular configuration and correspond to different semicircles.

In 1003, one or more images of the sample object are captured using an imaging optical unit and also using a detector, for example a CMOS or CCD sensor. 1003 can comprise the corresponding actuation of the detector. The image or the images in each case contain an imaged representation of the sample object. Different images are here associated with different illumination geometries from 1002.

In some examples, two pairs of images can be captured which are associated in each case with complementary, semicircular illumination directions. In other examples, it is also possible however for only two images or three images to be captured.

In that case, a difference could be formed, for example in accordance with $$\frac{I_{left} - I_{right}}{I_{left} + I_{right}}$$

$$\frac{I_{top} - I_{bottom}}{I_{top} + I_{bottom}}$$

wherein $I_{left}$ and $I_{right}$ designate the images that are in each case associated with a semicircular illumination geometry that is oriented left or right, and wherein $I_{top}$ and $I_{bottom}$ designate the images that are in each case associated with a semicircular illumination geometry oriented top or bottom.

Next, in 1004, a result image that illustrates a height profile of the sample object is determined. The determination of the result image in 1004 is based on a transfer function which describes the imaging of the sample object by the corresponding optical system for the corresponding illumination geometries. The result image is also determined based on the at least one image captured in 1003. To this end, it is possible for example to first form a difference and possibly to effect normalization from a plurality of images captured in 1003, which are associated with different illumination geometries.

For example, the method according to FIG. 10 could furthermore comprise scaling a reference transfer function to a size of the aperture of the imaging optical unit. That means that the reference transfer function can be adapted to the size of the aperture of the imaging optical unit.

In summary, techniques have been described above for determining even in the case of comparatively large apertures of the imaging optical unit used a result image having a strong contrast that codes for example the height of a sample object. These techniques are based on consideration of the size of the aperture of the imaging optical unit. Here, for example a specified reference transfer function can be scaled according to the size of the aperture of the imaging optical unit. The reference transfer function can therefore also be referred to as artificial transfer function because it can have deviations with respect to the transfer function that is theoretically expected on the basis of the illumination geometry.

The techniques described herein, for example relating to the transfer function, can in particular also be combined with reflected light geometry. This is illustrated in relation to the example of FIG. 11.

Figure 11:
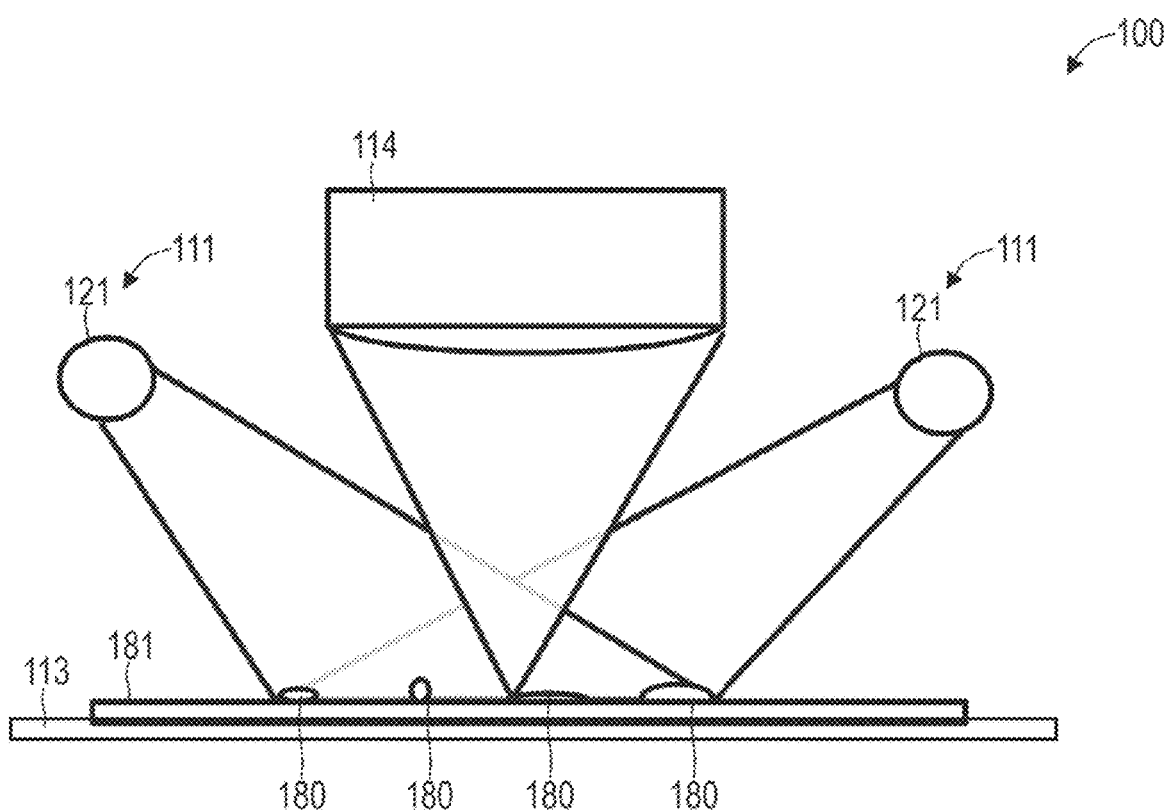
FIG. 11 schematically illustrates an illumination module and a detector in reflected light geometry according to various examples.

FIG. 11 illustrates aspects in relation to the optical system 100. In particular, FIG. 11 illustrates aspects in relation to an arrangement of the illumination module 111 and of the detector 114 in relation to a sample holder 113 that fixates a sample object 181. The sample object 181 comprises individual contaminants 180, for example lint.

In the example in FIG. 11, the illumination module 111 and the detector or the imaging optical unit (not illustrated in FIG. 11) are arranged in reflected light geometry, that is to say on the same side of the sample holder 113. In the example in FIG. 11, the adjustable illumination elements 121 are implemented by way of light sources. By way of example, the adjustable illumination elements 121 could be implemented by way of light-emitting diodes, etc.

In some examples, a central stop could also be provided which makes it possible to illuminate the sample object 181 (including the contaminants 180) in dark field geometry.

Using the optical system 100 in accordance with the example of FIG. 11, it may be possible to perform material testing of the sample object 181. For example, anomalies—such as the contaminants 180—can be detected. The sample object 181 does not have to be transmissive to light in this case. Using such techniques, it is possible to ensure that a height profile of the sample object 181 is determined by way of the angle-variable illumination. Here, the contaminants 180 then become very prominent.

Figure 12:
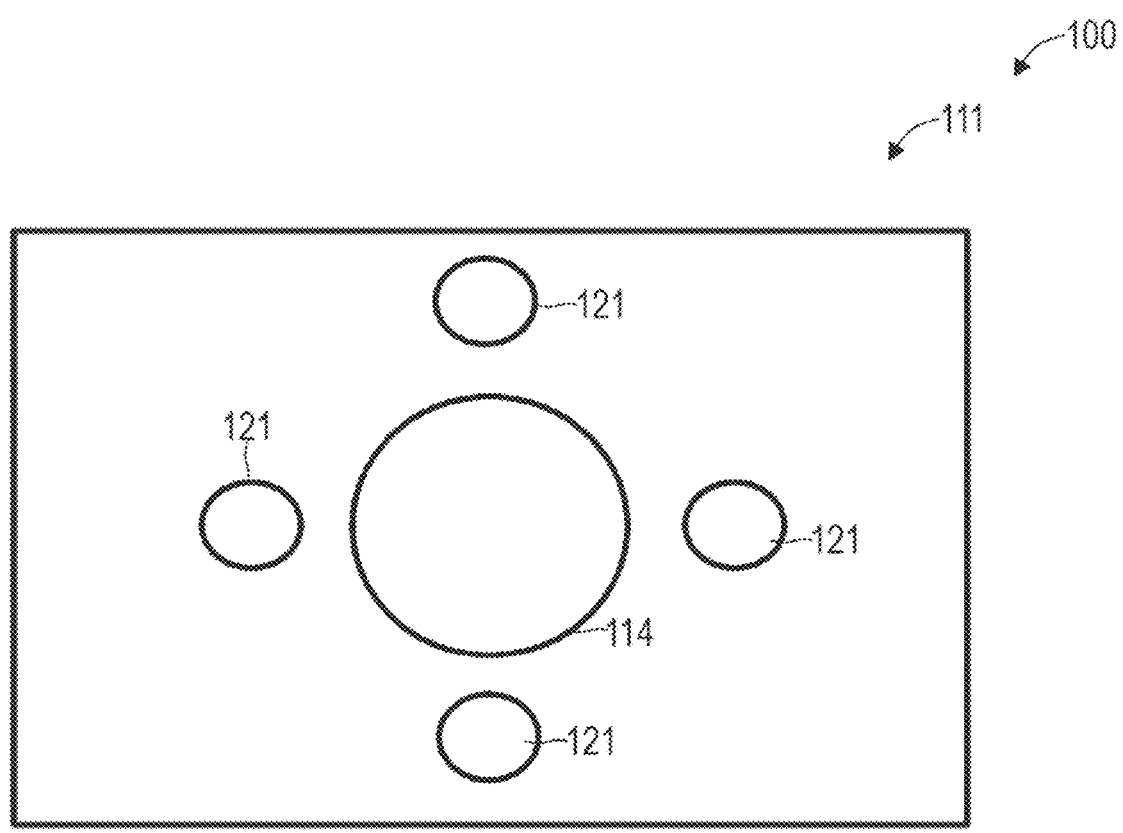
FIG. 12 schematically illustrates an illumination module and a detector in reflected light geometry according to various examples.
Figure 13:
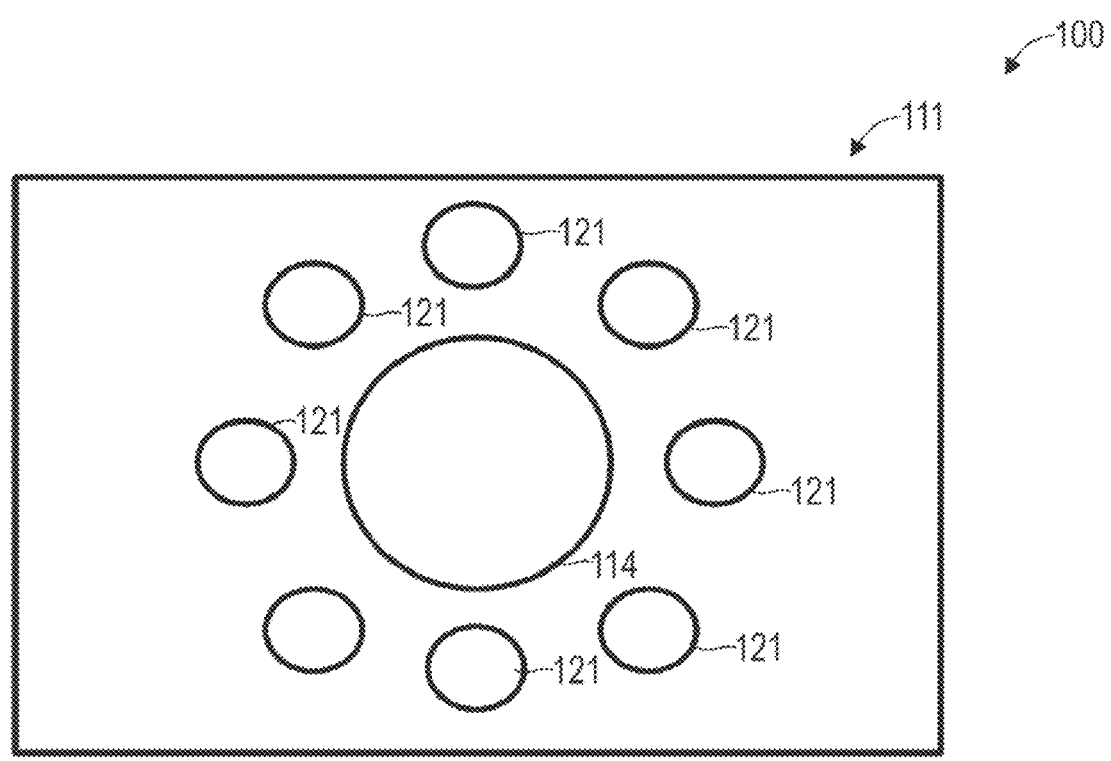
FIG. 13 schematically illustrates an illumination module and a detector in reflected light geometry according to various examples.
Figure 14:
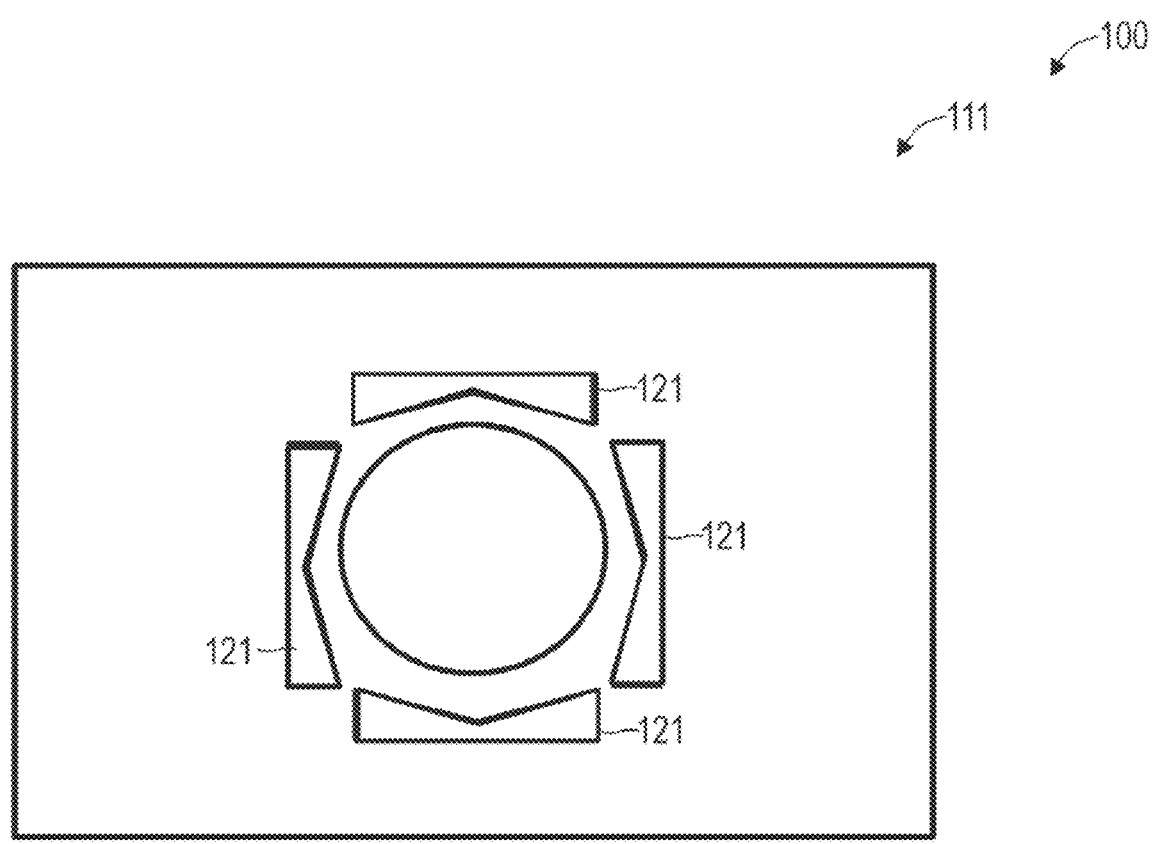
FIG. 14 schematically illustrates an illumination module and a detector in reflected light geometry according to various examples.

FIG. 12 illustrates aspects in relation to the optical system 100. FIG. 12 is a plan view of the illumination module. It is apparent here that the illumination module 111 has, as light sources, four adjustable illumination elements 121 that are arranged concentrically with respect to the detector 114. Variations of the illumination module 111 would also be possible here, compare FIGS. 13 and 14.

Based on the result image, which can be determined for example in accordance with the techniques described here on the basis of the transfer function 400, it is then possible for specific applications to be implemented. The result can be indicative of the height profile of the sample object 181. For example, it would be possible to determine regions of equal height based on the result image. Generally, it is possible, based on a result image that can be determined for example according to the techniques described here on the basis of the transfer function, to detect anomalies that correspond for example to the contaminants 180.

That means that specific deviations from the norm (anomalies) in the result image can be identified. Here, the norm can be specified or determined, for example, on the basis of reference regions in the result image. Such techniques are based on the finding that it is possible to detect the anomalies particularly well by way of the height profile of the sample object. For example, the anomalies can correspond to contaminants 180 such as lint located on the sample object, and thus indicate a deviation from the general topography of the sample object 181.

Here, different techniques for detecting the anomalies can be used in the various examples described herein. In some examples, it would be possible for the anomalies to be determined as extreme values in the contrast of the result image. For example, when the result image describes the height profile of the sample object 181, it may be possible to detect the extreme values as local deviations from the average height of the topography of the sample object. For example, such extreme values can be determined based on a threshold value comparison. For example, the threshold value taken into consideration in the threshold value comparison could be determined in relation to an absolute maximum and/or in relation to an average value of the contrast values of the result image.

As one example, consider a height profile that is a two-dimensional array of height elements, with each element indicating a height of a corresponding location on the sample object 181. An element may be compared to the elements that are within a predetermined radius of the element. The comparison may be based on a statistical parameter. For example, a selected element may be identified as an anomaly if the value of the element is more than a predetermined number of standard deviations (for example, more than one standard deviation) greater than an average of the values of elements in a circle of predefined radius surrounding the selected element. This analysis can be performed across the entire two-dimensional array. Well-known computational optimizations may be used so that an average and standard deviation do not have to be computed from scratch for each element of the array.

Alternatively or additionally, the anomalies can also be determined by techniques of machine learning, such as through unsupervised anomaly detection. In another example, an artificial neural network (ANN) could be used to classify local deviations from the norm. In various implementations, the ANN may be trained on a curated data set of many images of respective sample objects whose anomalies have been manually verified.

Alternatively or additionally, it is also possible to use techniques for using a deviation from a real-space pattern of the sample object 181 to detect the anomalies. For example, the sample object 181 could be a fabric sample that has a specific periodicity of the topography on the basis of the fabric structure. In some examples, it would be possible for such a periodicity or the real-space pattern of the topography of the sample object to be known as a-priori information. In other examples, it would however also be possible for the real-space pattern to be determined by way of a global frequency analysis of the sample object 181 as reference. It would then be possible that the anomalies are detected as local deviations from this real-space pattern.

Such local deviations from the real-space pattern can be detected here in various ways. For example, the controller can perform a frequency analysis of the result image to identify one or more periodic components of the result image, which can be subtracted out of the result image to generate a normalized image. Because the real-space pattern is suppressed, the anomalies in the normalized image are more prominent. The deviations from the real-space pattern of the sample object can be effected for example based on filtering in the spatial frequency space. Alternatively or additionally, autocorrelation that highlights changes in the periodicity can be performed. It is also possible for deviations with respect to a normalized image of the real-space pattern to be detected.

Figure 15:
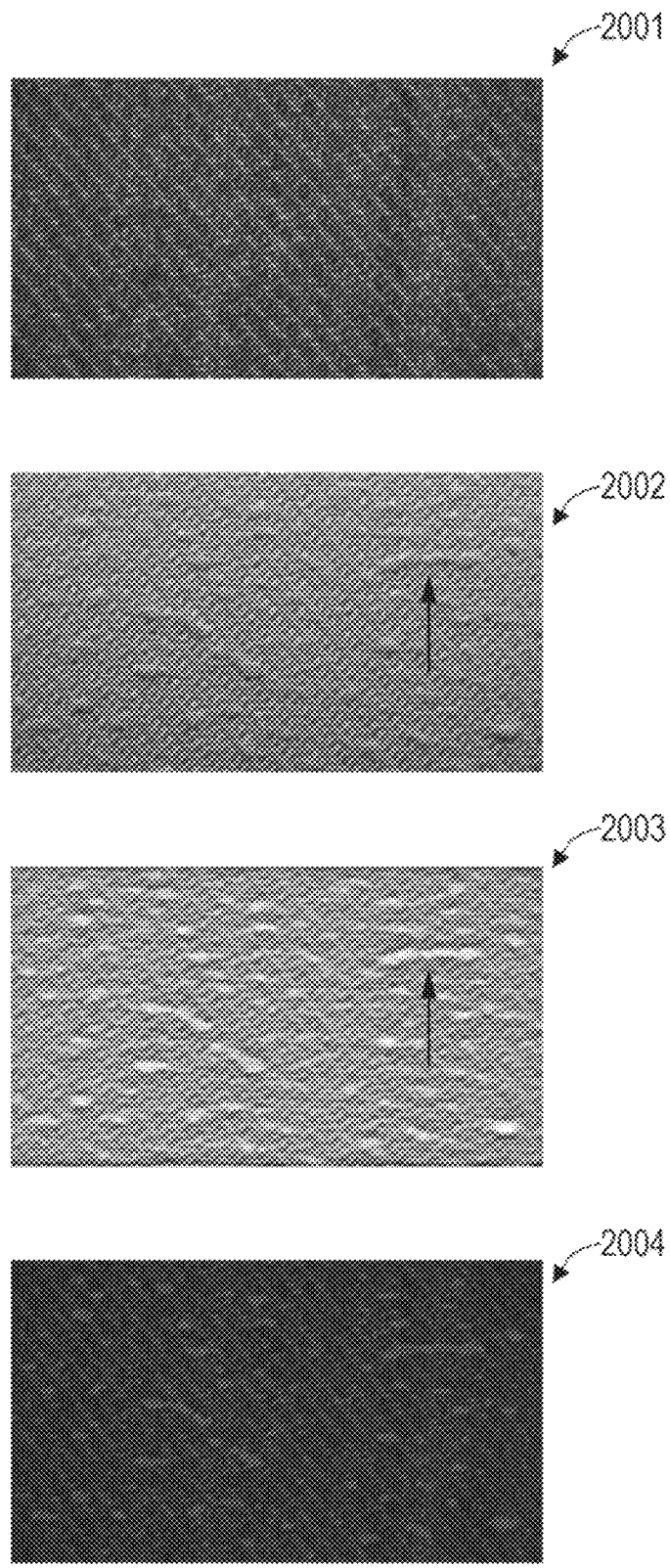
FIG. 15 illustrates various images and result images with height profiles according to various examples and also according to reference implementations.

FIG. 15 illustrates experimental results for the different techniques described here.

An image 2001 contains an imaged representation of a textile fabric. The image 2001 was captured in reflected light geometry with the illumination module 111 according to FIG. 12.

A result image 2002 was obtained using techniques described in DE 10 2014 112 242 A1. In the result image 2002, a contamination of the textile fabric is illustrated. It is clearly apparent in the result image 2002 that the upper edge of the contamination has a white contrast and the lower edge has a dark contrast, while the contamination centrally has a contrast that corresponds to the average contrast of the result image 2002. Therefore, the result image 2002 does have a contrast that codes the height of the sample object; however, the result image 2002 does not image a height profile but is rather proportional to the gradient of the height profile.

This is different in a result image 2003. The result image 2003 was determined in accordance with the techniques described here, that is to say using a suitable transfer function. The contamination is again marked with an arrow in the result image 2003. It is clear to see that the contamination centrally has a lighter contrast than along the edges thereof. The contrast of the contamination in its central region is also lighter than the average contrast of the result image 2003. Consequently, the result image 2003 indicates the height profile of the sample object. The diverse contaminations or pieces of lint in the result image 2003 become prominent with a particularly light contrast.

This can be utilized in various examples for detecting anomalies in the result image 2003. For this purpose, it would be possible in a simple implementation to detect local extreme values of the contrast of the result image 2003. For example, a threshold value comparison could be performed, wherein the corresponding threshold value can be determined for example in reference to a global maximum or a global minimum of the contrast values of the result image 2003. A corresponding evaluation is shown in an image 2004.

The textile fabric that is imaged by the images 2001-2004 also has a characteristic real-space pattern. The real-space pattern corresponds to the fabric of the yarn used. Alternatively or in addition to the threshold value comparison described above, it can also be possible to detect the anomalies based on this real-space pattern. For example, these anomalies could be detected as deviations from the real-space pattern of the sample object. To this end, for example filtering in the spatial frequency space could be performed or for example autocorrelation in one or two dimensions. In other examples, it could also be possible for a reference image which images the real-space pattern to be used.

FIG. 16 is a flowchart of an example method. Here, in 1011, anomalies are detected in a result image. By way of example, the result image could be determined by way of a method according to the example of FIG. 10.

It goes without saying that the features of the embodiments and aspects of the invention described above can be combined with one another. In particular, the features can be used not only in the combinations described but also in other combinations or on their own without departing from the scope of the invention.

Scaling of the amplitudes of the different transfer functions described here is simply for example. For example, the different examples described here frequently illustrated transfer functions with an amplitude of +1 and −1, but in other examples it may also be possible for transfer functions with different amplitudes to be used.

Furthermore, for example different implementations with respect to the illumination of the sample object with partially incoherent light have been described. The bandwidth of the transferred spatial frequencies is here equal to twice the aperture of the imaging optical unit. However, in different examples it could be possible to also use different techniques for illumination, meaning that the bandwidth of the transferred spatial frequencies is dimensioned differently. In the different examples described here, this can be taken into account for example by a corresponding scaling of a reference transfer function up to the theoretical maximum of the transferred spatial frequencies being effected.

Furthermore, different examples were described above with respect to the detection of anomalies in the result image. Generally, other techniques of material testing could also be used on the basis of the result image.

The invention claimed is:

1. An optical system comprising:
    an illumination module configured to illuminate a sample object with at least one pair of angle-variable illumination geometries corresponding to different illumination directions, thus implementing an illumination structured in angle space;
    an imaging optical unit configured to produce an imaged representation of the sample object that is illuminated with the at least one pair of angle-variable illumination geometries on a detector;
    the detector, wherein the detector is configured to capture at least one pair of real-space images of the sample object based on the imaged representation; and
    a controller configured to:
        determine a transfer function based on the at least one pair of angle-variable illumination geometries;
        determine a pairwise difference for each pair of the at least one pair of real-space images;
        determine a spectral decomposition of the pairwise difference; and
        determine a real-space result image based on the transfer function and the spectral decomposition.

2. The optical system of claim 1, wherein the illumination module and the detector are arranged in reflected light geometry.

3. The optical system of claim 1, wherein the illumination module is configured to illuminate the sample object in dark field geometry.

4. The optical system of claim 1, wherein:
    the controller is configured to detect anomalies in the real-space result image and
    the anomalies comprise extreme values in contrast of the real-space result image.

5. The optical system of claim 1, wherein:
    the controller is configured to detect anomalies in the real-space result image and
    the anomalies comprise deviations from a real-space pattern of the sample object.

6. The optical system of claim 5, wherein the controller is configured to determine the deviations from the real-space pattern of the sample object based on at least one of the following techniques: Fourier space filtering, autocorrelation, and deviations with respect to a reference image of the real-space pattern.

7. The optical system of claim 1, wherein:
the imaging optical unit is characterized by an aperture size, $N_A$;
a lower threshold is defined based on 5% of a maximum value of all absolute values of the transfer function for spatial frequencies between $-N_A$ and $N_A$; and
for spatial frequencies between $-N_A$ and $N_A$, each absolute value of the transfer function is greater than the lower threshold.

8. The optical system of claim 1, wherein:
the imaging optical unit is characterized by an aperture size, $N_A$;
a lower threshold is defined based on 2% of a maximum value of all absolute values of the transfer function for spatial frequencies between $-N_A$ and $N_A$; and
for spatial frequencies between $-N_A$ and $N_A$, each absolute value of the transfer function is greater than the lower threshold.

9. The optical system of claim 1, wherein:
the imaging optical unit is characterized by an aperture size, $N_A$;
a lower threshold is defined based on 0.5% of a maximum value of all absolute values of the transfer function for spatial frequencies between $-2N_A$ and $2N_A$; and
for spatial frequencies between $-2N_A$ and $2N_A$, each absolute value of the transfer function is greater than the lower threshold.

10. The optical system of claim 1, wherein:
the imaging optical unit is characterized by an aperture size, $N_A$ and for spatial frequencies between $-N_A$ and $N_A$, the transfer function has no local extreme values.

11. The optical system of claim 1, wherein the transfer function is a step function.

12. The optical system of claim 1, wherein the transfer function is one of a monotonously increasing function and a monotonously decreasing function.

13. The optical system of claim 12, wherein the transfer function is at least one of a linear function and a sigmoid function.

14. The optical system of claim 1, wherein the transfer function has an axis of symmetry that corresponds to an axis of symmetry of the at least one pair of angle-variable illumination geometries.

15. The optical system of claim 1, wherein:
the imaging optical unit is characterized by an aperture size, $N_A$;
an upper threshold is defined based on 5% of a maximum value of all absolute values of the transfer function for spatial frequencies between $-N_A$ and $N_A$; and
for spatial frequencies greater than $2N_A$ and for spatial frequencies less than $-2N_A$, each absolute value of the transfer function is less than the upper threshold.

16. The optical system of claim 1, wherein:
the imaging optical unit is characterized by an aperture size, $N_A$;
an upper threshold is defined based on 2% of a maximum value of all absolute values of the transfer function for spatial frequencies between $-2N_A$ and $2N_A$; and
for spatial frequencies greater than $2N_A$ and for spatial frequencies less than $-2N_A$, each absolute value of the transfer function is less than the upper threshold.

17. The optical system of claim 1, wherein:
the imaging optical unit is characterized by an aperture size, $N_A$;
an upper threshold is defined based on 0.5% of a maximum value of all absolute values of the transfer function for spatial frequencies between $-N_A$ and $N_A$; and
for spatial frequencies greater than $N_A$ and for spatial frequencies less than $-N_A$, each absolute value of the transfer function is less than the upper threshold.

18. The optical system of claim 1, wherein the controller is configured to determine the real-space result image based on a Tikhonov regularization with inverse Fourier transform.

19. A method comprising:
illuminating a sample object with at least one pair of angle-variable illumination geometries corresponding to different illumination directions, thus implementing an illumination structured in angle space;
producing an imaged representation of the sample object illuminated with the at least one pair of angle-variable illumination geometries on a detector;
based on the imaged representation, capturing at least one pair of real-space images of the sample object;
determining a transfer function based on the at least one pair of angle-variable illumination geometries;
a pairwise difference of the at least one pair of real-space images;
determining a spectral decomposition of the pairwise difference; and
based on the transfer function and the spectral decomposition, determining a real-space result image.

20. The optical system of claim 1, wherein the transfer function designates a transfer function other than an object transfer function or an optics transfer function.

21. The optical system of claim 1, wherein the controller is configured to:
determine a ratio of (i) a difference of each pair of the at least one pair of real-space images to (ii) a sum of the two images of the respective pair; and
determine the real-space result image based on the transfer function and the ratio.

* * * * *

UNITED STATES PATENT AND TRADEMARK OFFICE
CERTIFICATE OF CORRECTION

PATENT NO. : 11,506,485 B2
APPLICATION NO. : 16/664734
DATED : November 22, 2022
INVENTOR(S) : Lars Stoppe It is certified that error appears in the above-identified patent and that said Letters Patent is hereby corrected as shown below:

In the Claims

| | |
|---|---|
| Claim 10, Column 15, Line 36 | after "and", insert --¶-- |
| Claim 19, Column 16, Line 39 | "a pairwise" should be --determining a pairwise-- |

Signed and Sealed this
Fourth Day of April, 2023

Katherine Kelly Vidal
*Director of the United States Patent and Trademark Office*